INVENTOR.
Robert N. Knosp.
BY
Wood, Herron & Evans,
ATTORNEYS.

Fig. 13

United States Patent Office 3,303,725
Patented Feb. 14, 1967

3,303,725
VARIABLE SPINDLE SPEED TRANSMISSION SYSTEM
Robert N. Knosp, Ludlow, Ky., assignor to The Fosdick Machine Tool Company, Cincinnati, Ohio
Filed May 22, 1963, Ser. No. 282,318
3 Claims. (Cl. 74—740)

This invention relates to machine tools of the type having a rotatable tool spindle which is driven at a selected cutting speed and advanced axially relative to a workpiece to perform a machining operation such as drilling, counter boring, reaming and the like.

The present transmission system is disclosed in relation to the spindle of a jig boring machine, although it will be apparent that transmission systems utilizing the principles of the invention may be applied to other types of machine tools which involve the selection of variable cutting speeds. A typical jig boring machine, in general, comprises a stationary bed having a saddle or cross slide mounted for movement relative to the bed along one path of motion, with a work table slidably mounted upon the saddle and adapted to be shifted along a second coordinate path at right angles of the path of motion to the saddle. The jig boring machine includes a vertical column rising from the bed and having a transmission housing mounted at the top of the column and projecting in cantilever fashion above the work table. In the present example, the variable speed spindle transmission system of this invention is mounted within the housing at the top of the column and also includes a variable spindle feed transmission which advances the spindle axially at a feed rate related to the speed of rotation provided by the spindle speed transmission system.

During a machining operation, the workpiece is clamped upon the table and the hole center of the workpiece is aligned with the spindle and its tool by the combined movements of the feeder and table along their coordinates of motion. An apparatus for carrying out this operation in an automatic manner is disclosed in Patent No. 2,932,088, issued to Robert N. Knosp.

The tool spindle, which is driven by the present transmission system, is mounted for rotation at the selected speed in an axially shiftable quill. The quill, in turn, is shiftable axially (with the spindle) relative to a drill head which is adjustably mounted upon the column. During the machining operation, the drill head is clamped in place, the spindle is rotated at the selected speed by the present spindle transmission system, while axial feed motion is imparted to the quill and spindle by the feed transmission system of the housing. For rotating and feeding the spindle there is provided a spindle drive shaft and a spindle feed shaft interconnected with the two transmission systems in the housing and projecting downwardly into the drill head.

One of the primary objectives of the present invention has been to provide a spindle speed transmission of simple construction and adapted to provide a wide range of spindle speeds which are selected by an electrical control system.

Described generally, the variable spindle speed transmission system of the invention comprises an electrically controlled variable pitch pulley system, combined with a back gear train, also electrically controlled and in driving connection with the spindle drive shaft and spindle. The spindle transmission system is driven by a reversible electric motor mounted in the housing at the top of the column and belted to the variable pitch pulley system. The arrangement is such that the back gear train provides a low range and a high range ratio, while the pulley system provides the individual spindle speeds within the two ranges. By way of example, in the present disclosure, the pulley system provides spindle speeds from 43 to 300 r.p.m. when the back gear train is shifted to its low range setting and speeds from 300 to 2100 r.p.m. when the back gear train is shifted into its high range setting. The variable spindle speed transmission is also in driving connection with the variable feed transmission which imparts a selected feed rate to the quill and spindle in terms of decimal portions of an inch for each revolution of the spindle. The feed transmission does not form an essential part of the present invention.

Under manual control, the spindle speed in the two ranges is selected by a rotary speed selector switch and a range selector switch. The speed selector switch regulates a motor which forms a part of the variable pitch pulley system for changing the pitch of the pulley system, thereby providing a stepless range of spindle speeds. The range selector switch selectively energizes a high range electrically operated clutch or a low range electrically operated brake which are incorporated in the back gear train to provide the selected range. The actual spindle speed is indicated by an electrical tachometer driven by a generator in driving connection with the transmission system.

The spindle feed transmission may also be regulated by a selector switch which is manually operated. On the other hand, the feed and speed transmissions, as well as the other components of the machine, may be placed under the control of a numerical control system to provide complete automatic operation of the jig boring machine, as explained later.

A further objective of the invention has been to provide an improved back gear train having gears in constant mesh arranged to provide a low range or gear reduction ratio and a high range or direct drive by operation of the electrically operated clutch and brake, thereby to eliminate gear shifting elements and the attendant problem of properly meshing the gears when the gear train is shifted to its high or low range ratio.

According to this aspect of the invention, the back gear train, in general comprises a shaft which is coupled to the variable pitch pulley system, a rotatable gear housing adapted to be coupled to the input shaft, and an output shaft adapted to be coupled to the gear housing. The gear housing includes a constant mesh, back gear reduction train providing a driving connection from the input shaft to the output shaft.

When shifted into its high range, the gear housing is coupled by the electrically operated high range clutch directly to the input shaft. The arrangement is such that the gear reduction train then acts as a direct coupling from he input shaft to ouput shaft. When the low range rate is energized, then the rotatable gear housing is locked against rotation, converting the back gear train to a reduction system between the input shaft and output shaft.

A further objective of the invention has been to provide an electrically controlled back gear train which may be converted into a planetary system coacting with a spindle brake whereby the spindle may be stopped or jogged to a selected position for a tool change operation without deenergizing the main spindle motor, thereby eliminating the momentum of the motor and other parts to facilitate the jogging operation.

Described generally, the spindle brake is adapted to stop the output shaft upon being energized, thereby to stop the spindle while the back gear train operates as a planetary system which imparts rotary motion to the gear housing. This makes it possible to momentarily deenergize the spindle brake while energizing the low speed brake to impart rotary impulses to the spindle in order to jog it to a position suitable for tool changing. The jogging motion may be controlled by a manually operated switch or in an automatic manner under numerical control.

The various features and advantages of this invention will be more clearly apparent to those skilled in the art from the following detailed description taken in conjunction with the drawings.

In the drawings:

FIGURE 7 is a diagrammatic view showing the back gear train in the low speed range in response to energization of the low speed brake.

*Jig boring machine and operation generally*

Figure 1:
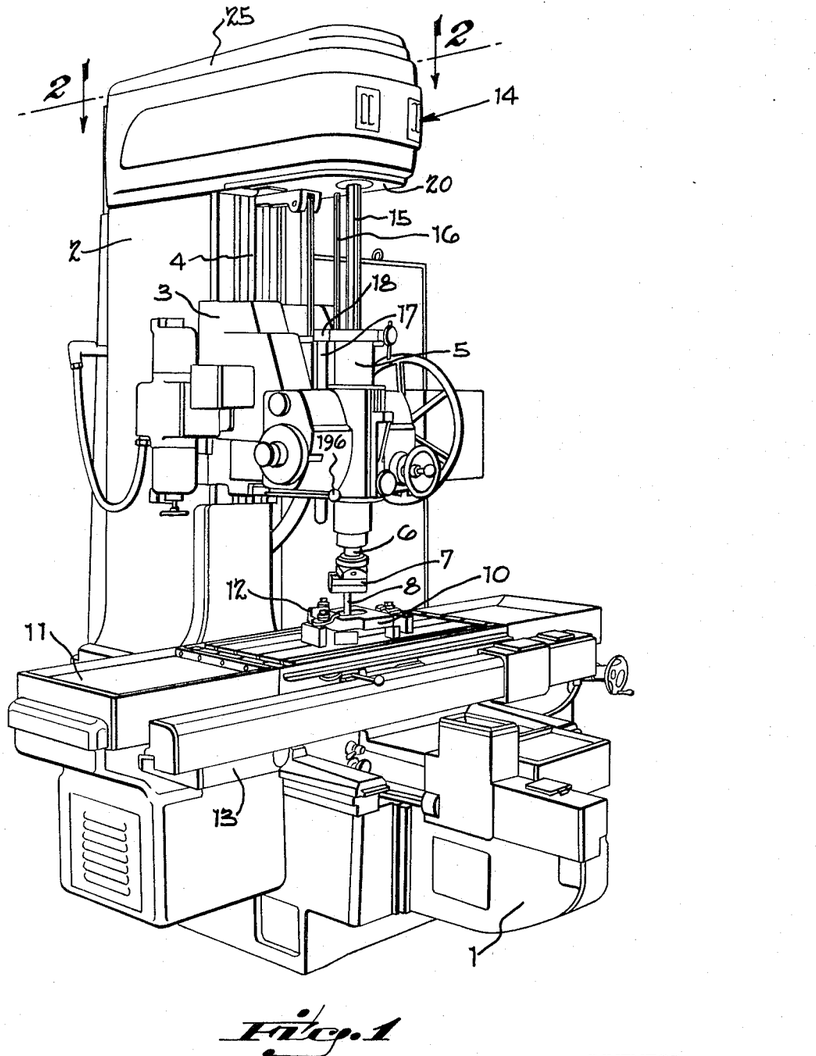
FIGURE 1 is a perspective view of a jig boring machine which is equipped with the spindle speed control apparatus of this invention.

The spindle speed transmission of the invention is embodied in the jig boring machine shown in FIGURE 1 in order to illustrate the principles of the invention, although the transmission may be utilized for various other types of machine tools, or machines in general, which require a relatively extensive range of speed changes. Described generally with reference to FIGURE 1, the jig boring machine comprises a bed 1, a column 2 rising upwardly from the rearward portion of the bed and having a drill head 3 mounted for vertical adjustment upon the ways 4 which form a part of the column 2.

The head 3 includes a quill 5 having a spindle 6 which projects from the lower end of the quill. The lower end of the spindle 6 includes a chuck 7, a tool 8 being clamped in the chuck. The tool 8 may represent a drill, reamer, counter-boring tool or the like acting upon a workpiece 10 which is clamped upon a work table 11.

During a machining or jig boring operation, the workpiece 10 is clamped to the table 11 by suitable clamping fixtures 12. The table 11 is slidably mounted for longitudinal motion upon a cross slide or saddle 13. The saddle, in turn, is slidably mounted upon the bed 1 of the machine for motion toward or from the column 2, that is at right angles to the path of motion of the table, such that the hole centers of the workpiece may be located by the coordinated movements of the table 11 and saddle 13.

In order to locate the table 11 and saddle 13 precisely in their selected positions, the machine disclosed in FIGURE 1 is provided with selective lineal measuring rods or gauges, one set for the table 11 and the second set for the saddle 13. The measuring rods of each set may be shifted in groups to their active measuring positions by means of manually operated dials or they may be shifted automatically in response to signals generated by a tape controlled programming apparatus, as disclosed in the Knosp Patent 2,932,088.

The spindle 6 is rotated at a selected speed by the spindle speed change transmission of this invention which is mounted in the housing 14 which projects in cantilever fashion from the upper end of the column 2 (FIGURE 1). Rotary motion is transmitted from the spindle transmission by way of the splined spindle drive shaft 15 which projects downwardly from housing 14 to the quill 5 and spindle 6. The arrangement is such that the quill 5 is shiftable vertically with respect to the drill head 3 at a selected feed rate to advance the rotating spindle 6 and its tool 8 vertically with respect to the workpiece 10 during the machining operation. In other words, the quill is non-rotatable but shiftable vertically, while the spindle is journalled for rotation within the quill and is fed vertically by the quill. In the present example, the splined shaft 15 moves vertically with the quill and is slidable with reference to a drive sleeve of the spindle speed transmission, as described later.

During a machining operation axial motion is imparted to the quill 5 and spindle 6 by a splined spindle feed shaft 16 (FIGURE 1) which projects downwardly from the housing 14 to the drill head 3 in parallel relationship to the spindle drive shaft 15. The feed shaft 16 is driven at a selected rate by a variable spindle feed transmission mounted in housing 14 and in driving connection with the spindle speed transmission. The feed shaft 16 is slidable relative to the housing 14, similar to drive shaft 15, as explained later. The feed change transmission does not form an essential part of the present invention; however, it will be understood that the arrangement provides a spindle feed rate which is directly related to the spindle speed, thereby imparting a given unit of axial feed motion to the quill and spindle upon each rotation of the spindle.

The variable spindle speed transmission may be regulated manually to impart the required speed of rotation to the spindle. The spindle feed transmission also may be regulated manually to impart the required axial feed for each revolution of the spindle. On the other hand, the present apparatus is also intended to be regulated in an automatic manner under tape control. A numeral tape control apparatus providing automatic regulation of the several functions of the jig boring machine, including selection of the spindle speed rate and spindle feed, is disclosed in the copending application of Robert N. Knosp et al., Serial No. 786,589, filed on January 13, 1959, now Patent No. 3,109,329.

It will be understood that the drill head 3 (FIGURE 1) is clamped rigidly to the ways 4 of the column during the machining operation, such that the feed depth is controlled accurately by measuring the axial movement of the quill 5 with respect to the head. The depth of the spindle (and tool) feed may be regulated by hand if desired or the depth may be controlled automatically, utilizing the spindle control apparatus disclosed in the co-pending application of Robert N. Knosp et al., Serial No. 51,023 which was filed on August 22, 1960, now Patent No. 3,100,406.

The automatic spindle control apparatus provides a first stage of operation arranged to advance the spindle downwardly at a rapid traverse rate toward the work surface to save time, and a second stage wherein the spindle is fed at a slower, preselected feed rate to a predetermined depth. Upon reaching the predetermined depth, the spindle is shifted upwardly at a rapid traverse rate to its retracted position. The present apparatus, explained in detail later, includes a rapid traverse motor in driving connection with the spindle feed shaft 16, which operates independently of the feed transmission during rapid advancement and retraction of the spindle.

The driving train from the feed shaft 16 to the quill 5 is not disclosed in the drawings since the structure does not form an essential part of the invention. In general, the drive train is journalled within the head 3 and may include a worm keyed to feed shaft 16 and meshing with a worm wheel. The worm wheel, in turn drives a pinion within head 3 meshing with a rack bar 17 (FIGURE 1) slidably journalled in the drill head 3. The upper end of the rack bar is connected as at 18 to the upper end of the quill, the arrangement being such that the quill is isolated from forces which may otherwise be developed to cause runout due to the feed pressure.

Although the head 3 is clamped rigidly to the column 2 during a machining operation, it is necessary, at times, to shift the drill head vertically along the column to different elevations in order to compensate for the size of the workpiece 10. This operation may be carried out by hand or it may be done in an automatic manner under tape control. An automatic apparatus for this function is disclosed in the co-pending application of Robert N. Knosp, Serial No. 135,879, which was filed on September 5, 1961, now Patent No. 3,171,301.

*Spindle speed and feed transmission—
General arrangement*

Figure 2:
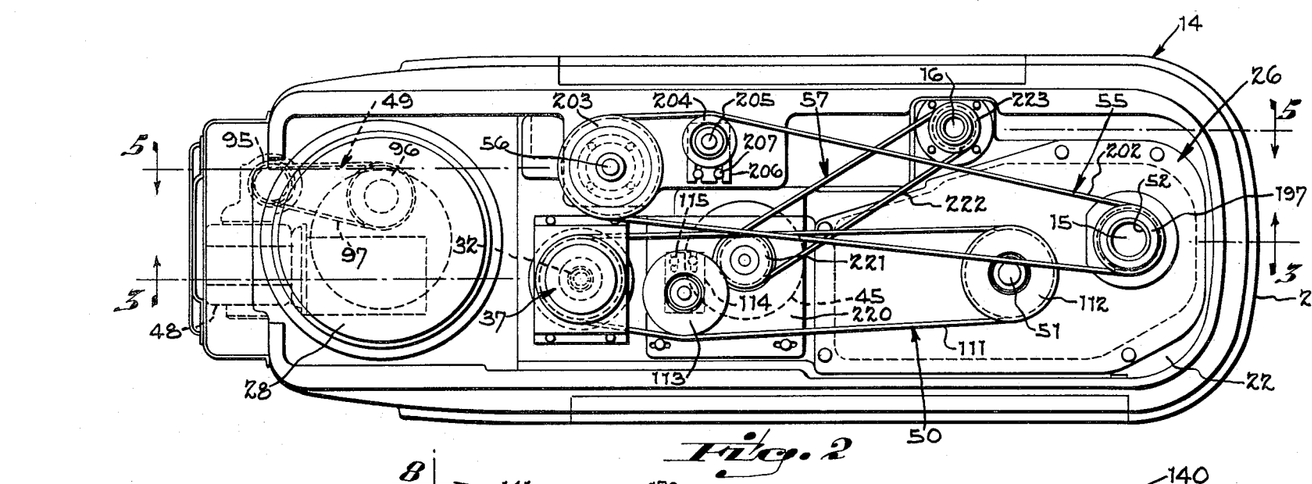
FIGURE 2 is a top plan as viewed generally along the line 2—2 of FIGURE 1, illustrating the speed and feed change housing with the cover removed.
Figure 3:
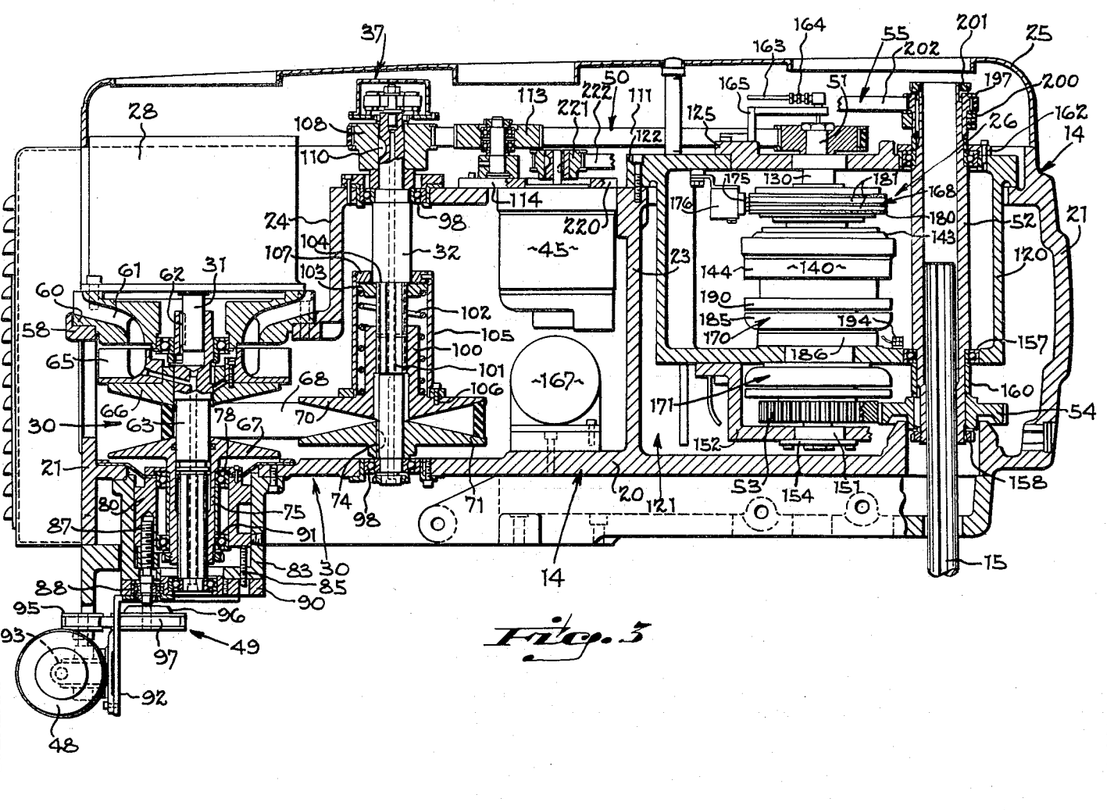
FIGURE 3 is a sectional view taken along line 3—3 of FIGURE 2, illustrating the general arrangement of the spindle speed change transmission of this invention.
Figure 5:
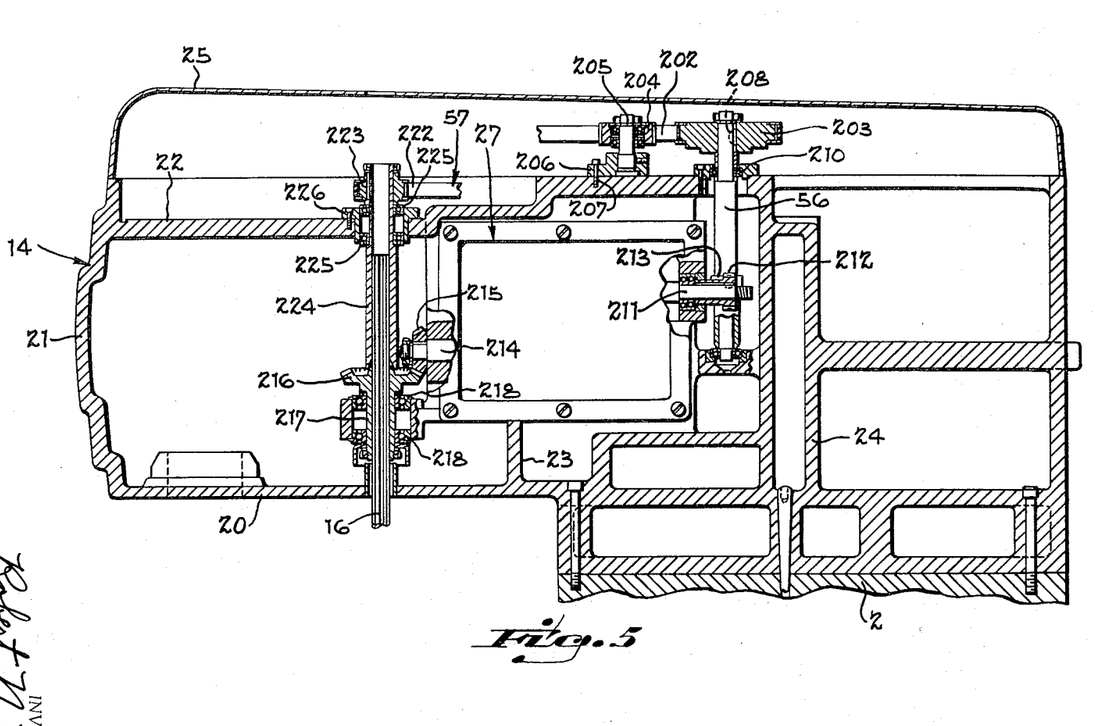
FIGURE 5 is a sectional view taken along line 5—5 of FIGURE 2. This view is shown in an upright position corresponding to FIGURE 3 and has been reversed end-for-end in order to clarify the relationship of parts.

As best shown in FIGURES 2, 3 and 5, the variable spindle speed transmission and feed transmission both reside within the housing 14 (FIGURE 1), which is mounted upon the upper end of column 2. The housing essentially comprises an elongated casting having a bottom wall 20, a continuous vertical wall 21 rising from the bottom wall, and a top wall 22. The casting includes suitable intermediate compartments, delineated for example, by partition walls 23 and 24 having flanges for mounting the several components of the speed and feed transmissions within the housing. The upper portion of housing 14 includes a cover plate 25 which encloses the belt driving system and other components, which are disposed above the top wall 22.

Described generally, the electrically controlled back gear train (spindle speed) is indicated generally at 26 (FIGURE 3) and the spindle feed transmisison is indicated generally at 27 (FIGURE 5). Both transmission systems are driven by the motor 28, which is also mounted within the housing 14. The motor 28 is in driving connection with a variable pitch pulley system, indicated generally at 30 (FIGURE 3). The variable pitch pulley system coacts with the electrically controlled spindle back gear train 26 to provide the complete range of spindle speeds.

In the present example, the variable pitch pulley 30 system provides a ratio of 7 to 1 from the motor 28 to the electrically-operated back gear train 26. In other words, the variable pitch pulley system 30, in the position shown in FIGURE 3 provides a 3½ to 1 slow-down ratio from the shaft 31 of motor 28 to the shaft 32 of the variable pitch pulley system 30. When the pulley system 30 is shifted to an intermediate position (not shown) it provides a ratio of 1 to 1 from the motor shaft 30 to the shaft 32. When shifted from the position of FIGURE 3 to its opposite limit, then the system provides a 1 to 3½ speed-up ratio from the motor shaft 31 to the shaft 32 of the pulley system, thus making a total speed change ratio of 7 to 1 from maximum to minimum limits of adjustment.

It will be understood that the speed changes provided by the variable pitch pulley system are stepless when the spindle speed change apparatus is regulated manually. In order to indicate the selected speed (which is the combined function of the variable pitch pulley system 30 and the back gear train 26) there is provided an electrically operated tachometer 33 (FIGURE 13) of panel 34, which guides the operator in selecting the required spindle speed. In the manual selection of spindle speeds, the operator shifts a rotary spindle speed selector switch 35, which is mounted upon the control panel 34. Selector switch 35 provides gradual spindle speeds increasing from minimum to maximum ratio.

As noted above, the back gear train 26 provides two speed ranges, one comprising the low range and the other the high range. In the present example the back gear train provides a reduction of 7 to 1 from the variable speed pulley shaft 32 (FIGURE 3) to the spindle drive shaft 15. Otherwise expressed, the back gear train 26 provides a reduction of 7 to 1 between shafts 32 and 15 in the low speed range and provides a 1 to 1 ratio in the high speed range. In the present example, the pulley and back gear system provide spindle speeds from 43 r.p.m. to 300 r.p.m. in the low range and from 300 r.p.m. to 2100 r.p.m. in the high range. The two speed ranges, under manual control, are selected by operating a rotary range selector switch 36 (FIGURE 13) mounted upon the panel 34 adjacent the speed selector switch 35 of the pulley system.

The tachometer 33 is energized by an electrical tachometer generator 37 (FIGURE 13) which is mounted upon the upper end of the shaft 32 of the pulley system. In order to provide a true reading of the spindle speed, the tachometer is provided with two sets of calibrations. The first set 38 (FIGURE 13) is calibrated to read the high range spindle speed in r.p.m. (with the back gear train 26 shifted to its high range setting); the second set 40 is calibrated to provide a reading of the low range spindle speed (with the back gear train 26 shifted to its low range setting).

The control panel 34 includes a push button switch 41 for jogging the spindle for a tool change or for other purposes without deenergizing the motor 28. This is done by alternately deenergizing one of the electrically operated brakes of the back gear system and energizing an electrically operated spindle brake, as explained later. This arrangement saves time since it eliminates the lag involved in starting and stopping the main motor 26 for jogging. It will be understood that the several manually operated switches of the panel 34 are interconnected in an electrical circuit which regulates the electrically operated clutches of the back gear train 26 and of the feed transmission 27. This circuit is interconnected with the programming system when the machine is placed under tape control.

In certain machining operations, particularly when tapping a hole in the workpiece, it is necessary to reverse the rotation of the spindle in order to unscrew the tap from the tapped hole after the operation is completed. For this purpose, the spindle motor 28 is of the reversible type and the control panel 34 includes a reversing switch 42 which energizes the motor 28 in the reverse direction. It will be understood at this point, that the spindle speed and feed control switches remain in their original setting when the motor 28 is reversed to unscrew the tap from the tapped hole.

As noted above, the spindle feed transmission 27 (FIGURE 5) is also of the variable type and is also regulated by a rotary selector switch 43 mounted upon the control panel 34. This switch includes graduations 44 indicating the spindle feed rates, preferably in terms of decimal portions of an inch, for each rotation of the spindle. Since the spindle feed transmission 27 does not form a part of the invention, it has not been disclosed in detail.

In order to advance or retract the spindle at the rapid traverse rate, the housing 14 includes a reversible rapid traverse motor 45 (FIGURES 2 and 3). This motor, as explained later, is belted to the feed shaft 16 and is controlled either by the programming apparatus or by the manually operated traverse switches 46 and 47 of the control panel 34 to raise or lower the quill and spindle at the rapid traverse rate. The feed transmission 27 includes electrically operated clutches for selecting the several feeds. When the rapid traverse switches 46 or 47 are actuated, these clutches are shifted to a neutral position, permitting the rapid traverse motor 45 to rotate the feed shaft 16 independently of the feed transmission 27 to advance or retract the quill and spindle.

When the jig boring machine is placed under tape control, a suitable switching apparatus not shown), actuated by the numerical control system, is utilized in place of the manually operated control switches outlined above. Under numerical control however, it is necessary to select the spindle speeds in terms of steps. Thus, by way of example, the switching apparatus may be arranged to provide sixteen spindle speeds and the tape of the numerical control system is coded to select any one of the sixteen spindle speeds. The tape is also coded to provide the spindle feed rates, spindle rapid traverse in either direction, spindle reverse and spindle braking and jogging, as outlined above. These operations are performed in sequence with the other machine functions in response to the signals generated by the tape controlled apparatus.

Figure 4:
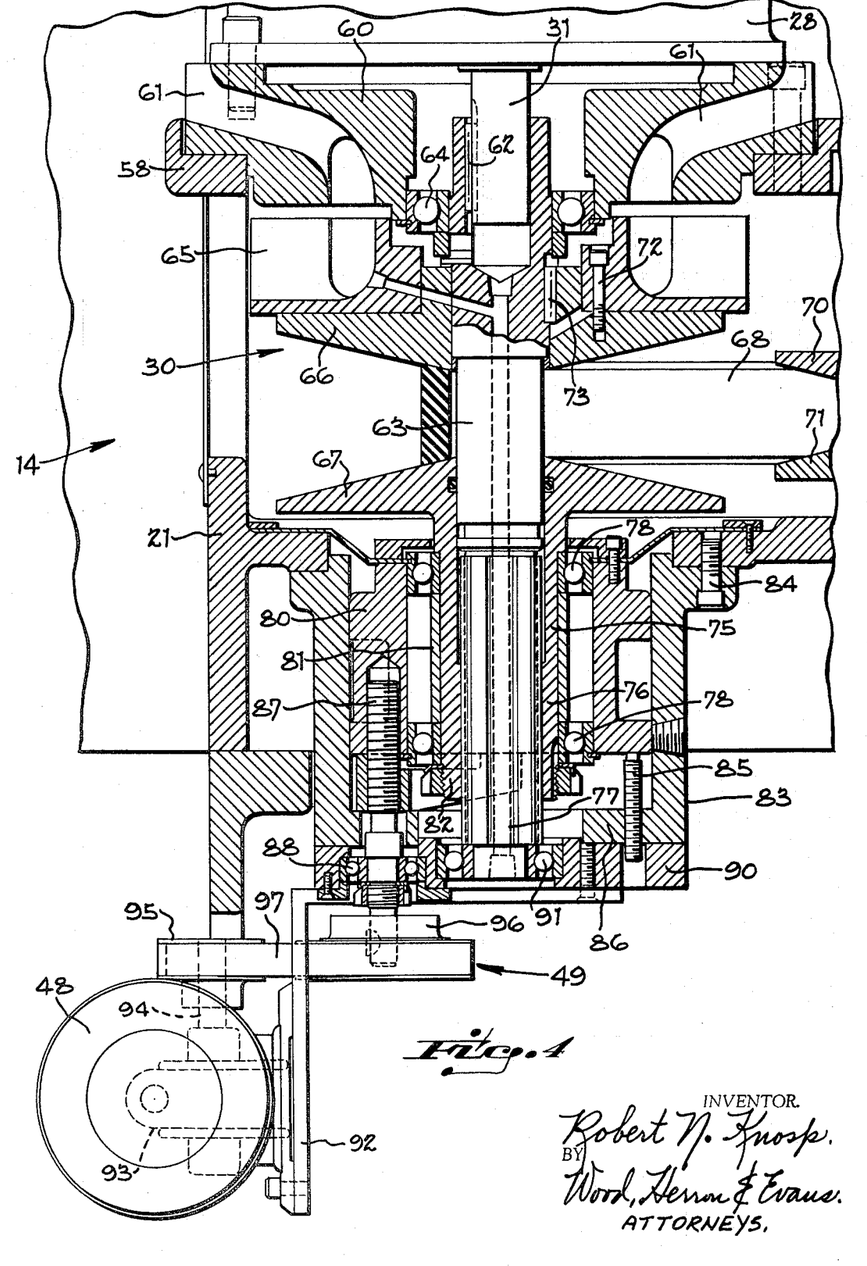
FIGURE 4 is an enlarged fragmentary sectional view taken from FIGURE 3, detailing a portion of the variable pitch pulley system which forms a part of the spindle speed transmission.

As best shown in FIGURES 3 and 4, the variable pitch pulley system 30 is regulated by a speed selector motor 48. This motor is of the reversible gear-head type and includes a driving system, indicated generally at 49 arranged to vary the effective pitch diameters of the pulley system 30 to provide the desired spindle speed. Speed selector motor 48 is energized by the speed selector switch 35 (FIGURE 13) through the electrical system in forward or reverse directions to provide the required spindle speed in the high or low ranges. As noted above, the operator (under manual control) shifts the range selector switch 36 for the high or low range, then rotates the spindle speed selector switch 35 in a direction to increase or decrease the spindle speed, observing the proper tachometer scale 38 or 40 to obtain the desired spindle speed reading.

As best shown in FIGURE 2, power is transmitted from the pulley shaft 32 of the variable pitch pulley system 30 to the back gear train 26 by way of a belt and pulley system, indicated generally at 50. The pulley system 50 drives an input shaft 51 of the back gear train, which in turn, rotates the spindle drive shaft 15, as explained later. As shown in FIGURE 3, the drive from pulley system 50 and input shaft 51 is completed to the spindle drive sleeve 52 and spindle shaft 15 by way of the gears 53 and 54.

In the present disclosure, the several belt driving systems, including the system 50, is of the conventional timing belt type wherein the belt is provided with teeth, meshing with corresponding teeth formed on the periphery of the pulleys to provide a positive drive. However, it will be understood that the several pulley driving systems may also comprise multiple V-belts and V-pulleys of conventional design.

Figure 13:
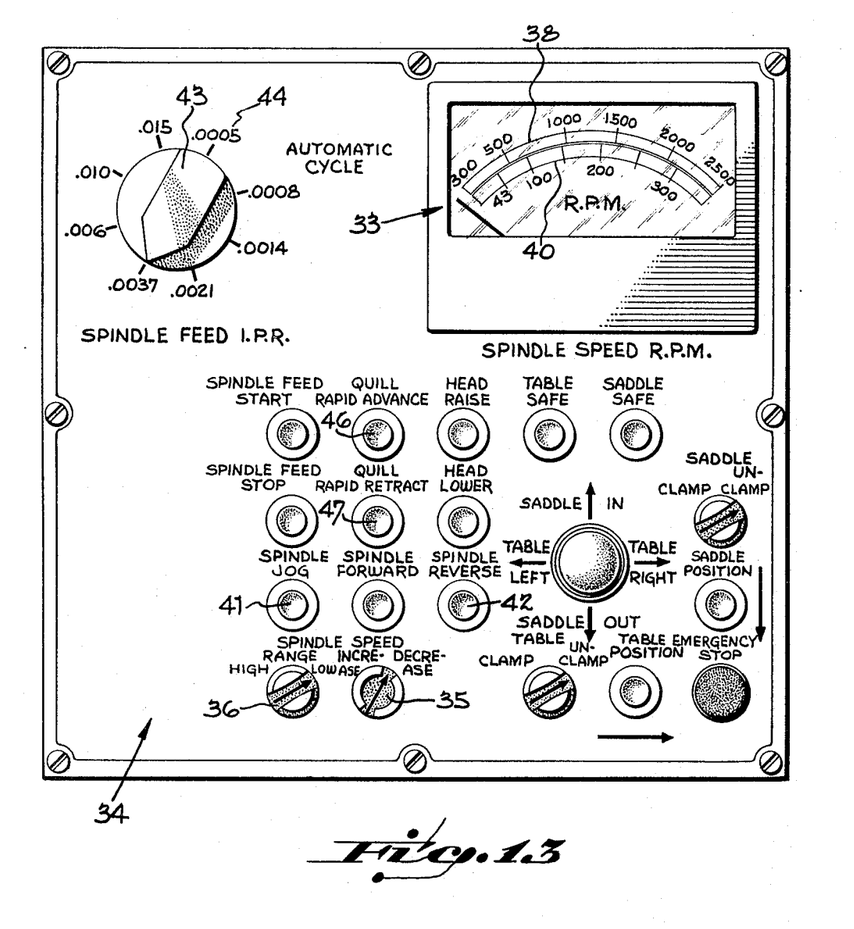
FIGURE 13 is a diagrammatic view of the control panel, including the several switches for selecting the spindle speeds, feeds and other functions manually.

From the spindle drive sleeve 52 (FIGURES 2 and 5), a pulley driving system, indicated generally at 55, rotates an input shaft 56 of the spindle feed transmission 27, which drives spindle feed shaft 16. The pulley system 55 thus rotates the feed transmission 27 in time with the spindle rotation, the actual spindle feed being provided by the gear train (not shown) within the feed transmission 27. In the present example, the feed transmission 27 provides eight different spindle feed rates in terms of units or decimals of an inch per each spindle rotation, as selected by operation of the feed selector switch 43 (FIGURE 13).

The rapid traverse motor 45 (FIGURE 2) is in driving connection with the spindle feed shaft 16 by way of a belt and pulley system, indicated generally at 57. As noted earlier, the electrical control system is arranged to shift the electrical feed clutches to a neutral position when the rapid traverse motor is energized, thereby permitting the feed shaft 16 to be rotated independently of feed transmission 27. The traverse motor 45 is of the reversible type and the direction of motor rotation is regulated by the rapid traverse switches 46 and 47 (FIGURE 13) which energize the motor 45 either in forward or reverse directions.

*Variable pitch pulley system*

The variable pitch pulley system 30 is best shown in FIGURES 3 and 4. The motor 28, which drives the speed and feed transmission systems, is mounted upon a horizontal flange 58 extending between the intermediate wall 24 and the side wall 21 of housing 14. The motor includes a mounting plate 60 secured to the flange 58 and including air passageways 61. The shaft 31 of the motor is keyed as at 62 to a shaft 63 which forms a part of the variable pitch pulley system 30. As viewed in FIGURES 3 and 4, the upper portion of shaft 63 is journalled in a ball bearing 64 confined in the mounting plate 60. The shaft 63 includes an impeller 65 communicating with the passageways 61 for circulating air through the housing 14.

The shaft 63 includes a pair of drive pulley sections 66 and 67 connected by a belt 68 to a pair of driven pulley sections 70 and 71. The upper section 66 of the drive pulley is secured by screws 72 (FIGURE 4) to the impeller 65, which in turn is keyed as at 73 to the shaft 63.

In order to change the pitch of the pulley system 30, the drive pulley section 67 is shiftable along shaft 63 with respect to its companion section 66, which rotates in a fixed plane. The driven pulley section 70, in the same manner is shiftable axially with respect to its companion section 71, which is keyed as at 74 to the pulley shaft 32. The pulley system 30 is conventional, the arrangement being such that the driven pulley section 67 is shiftable along the shaft 63 by operation of the feed selector motor 48 to vary the pitch diameter of the drive pulley. This motion causes the driven pulley section 70 (which is spring loaded) to be shifted by the belt 68 a corresponding distance to alter the pitch diameter of the driven pulley.

In the position of the parts shown in FIGURE 3, the drive pulley sections 66 and 67 are shown in their outward limit of motion, while the driven pulley sections 70 and 71 are shown in their position of maximum pitch diameter. This position represents the minimum spindle speed provided by the pulley system 30. When the spindle speed is increased, the shiftable drive pulley section 67 is shifted upwardly toward its companion section 66, so as to increase the pitch diameter of the drive pulley sections while correspondingly decreasing the pitch diameter of the driven pulley sections.

In the position shown in FIGURE 3, the pulley system 30 provides a reduction or slow-down drive from the motor shaft 31 to the pulley shaft 32. When the drive pulley section 67 is shifted to its opposite limit toward section 66, then the pulley system provides a speed-up ratio from the motor shaft 31 to the pulley shaft 32. As noted earlier, in the present example, the pulley system provides a reduction or slow-down ratio of 3½ to 1 from the motor shaft to the pulley shaft in the position shown. In the intermediate adjustment of the pulleys, there is provided a one to one speed ratio from the motor shaft 31 to the pulley shaft 32. At its opposite limit of adjustment there is provided an increase or speed-up ratio of 3½ to 1 from the motor shaft 31 to the pulley shaft 32.

In order to permit the driven pulley section 67 to be shifted axially for speed changes, the pulley section 67 includes a sleeve portion 75 (FIGURES 3 and 4), the lower portion of which is slidably keyed as at 76 to the splined portion 77 of the shaft 63, permitting the sleeve 75 and its pulley section 67 to be shifted axially along the shaft 63. The sleeve portion 75 is journalled in ball bearings 78—78 which are confined in a shiftable bearing cage 80. The bearings 78—78 are held in spaced relationship by a tube 81, the bearings 78 being clamped in place by a retainer ring 82 which is screwed to the lower end of the sleeve portion 75.

In order to adjust the variable pitch pulley system, the bearing cage 80 is slidably confined in a cylindrical housing 83 which is secured as at 84 to the bottom wall 20 of housing 14. The lower limit of motion of the cage 80 (in the position shown in FIGURE 4) is determined by an adjustable limit screw 85 threaded through the bottom wall 86 of housing 83 and engaging the lower end of cage 80 at its downward limit.

In order to shift the pulley section 67 relative to the pulley section 66, there is provided a vertical screw shaft 87 (FIGURE 4) in threaded engagement with the shiftable cage 80. The lower portion of screw shaft 87 is journalled in a ball bearing 88 which is seated in a bearing plate 90 secured to the lower end of cylindrical housing 83. Bearing plate 90 also confines a ball bearing 91 which journals the lower end of shaft 63. It will be understood that rotation of the screw shaft 87 is effective to shift the bearing cage 80 axially relative to the cylindrical housing 83 for changing the speed ratio of the pulley system.

As noted earlier, there is provided a speed selector motor 48, controlled by the speed selector switch 35 (or tape) for rotating the screw shaft 87 for the required spindle speed. As best shown in FIGURE 4, the motor 48 is secured to a bracket 92 projecting downwardly from the bearing plate 90. The motor includes a gear head reduction unit 93 which includes a vertical shaft 94 upon which is keyed a drive pulley 95. A companion pulley 96 is keyed to the lower end of the screw shaft 87 and is connected to the pulley 95 by a belt 97. The speed selector motor 48 is reversible so as to rotate the screw shaft in forward or reverse directions in response to a position of the rotary speed selector switch 35, thereby to raise or lower the cage 80 and pulley section 67.

The pulley shaft 32, upon which the driven pulley sections 70 and 71 are mounted, is journalled in ball bearings 98—98 (FIGURE 3), which are confined in the bottom and top walls 20 and 22 of the housing 14. The shiftable driven pulley section 70 includes a sleeve portion 100 which is slidably keyed to the splined portion 101 of shaft 32 for vertical motion. Pulley shaft 32 includes a compression spring 102 surrounding the sleeve portion 100 and having its lower end seated against the shiftable pulley section 70. The upper end of spring 102 is seated against a retainer disk 103 seated against the shoulder 104 of shaft 32.

The compression spring 102 is enclosed by a tube 105 having its lower end secured as at 106 to the pulley section 70. The upper end of tube 105 includes a disk 107 which slidably embraces the cylindrical portion of shaft 32. By virtue of this arrangement, the compression spring 102 urges the upper pulley section 70 downwardly under sufficient pressure to provide frictional engagement with the belt 68 while adapting the section 70 to shift in response to adjustment of the drive pulley section 67.

Figure 6:
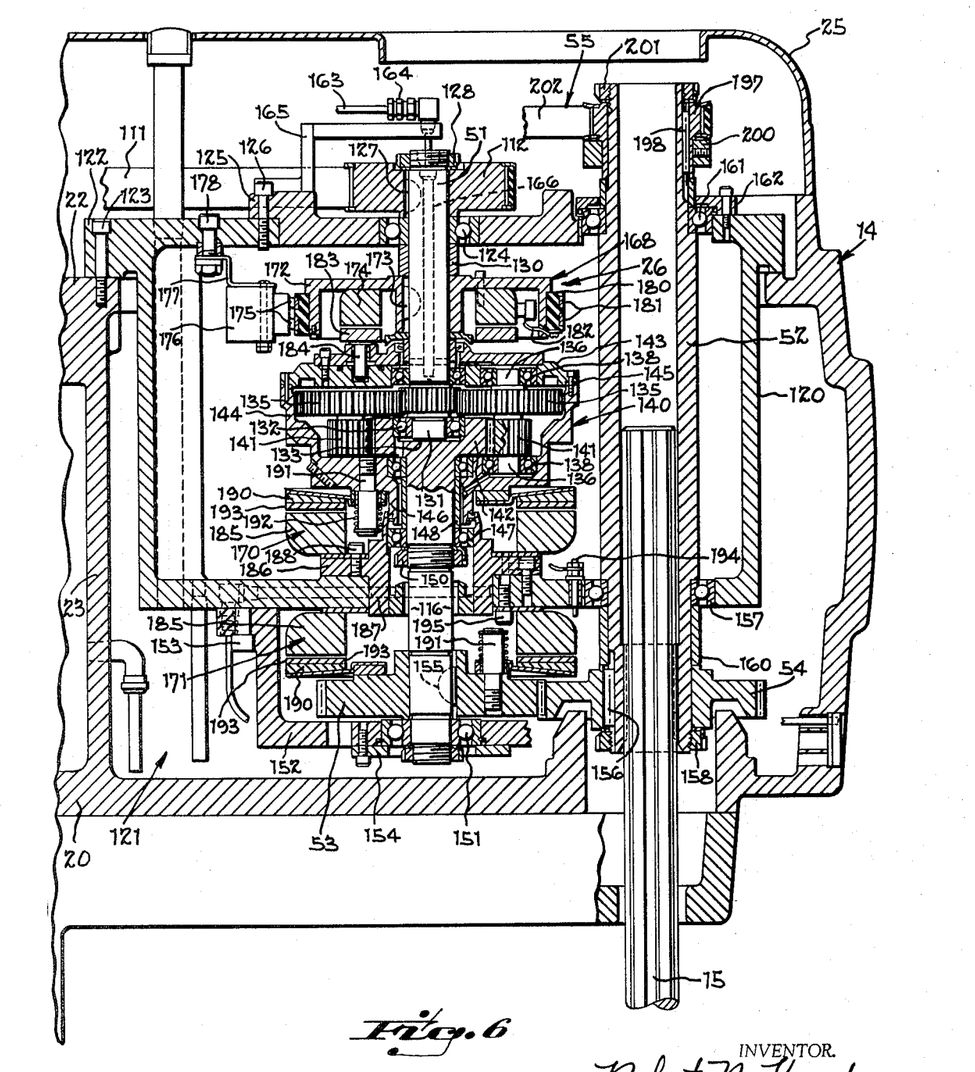
FIGURE 6 is an enlarged fragmentary sectional view taken from FIGURE 3, detailing the back gear train and magnetic clutch and brake arrangement.

The upper end of shaft 32 includes a pulley 108 (FIGURE 3) which is keyed to the shaft as at 110. Pulley 108, in the present example is a conventional timer pulley having teeth, meshing with teeth formed in the belt 111 of the pulley system, previously indicated at 50. The belt 111 passes around a pulley 112 which is keyed to the input shaft 51 of the back gear train 26 (FIGURES 2, 3 and 6). In order to regulate the tension of belt 111, there is provided an idler pulley 113 (FIGURE 2) located adjacent the pulley 108. Idler pulley 113 is journalled upon a bracket 114 which is adjustably secured as at 115 to the top wall 22 of housing 14. The tachometer generator 37 is mounted upon the upper end of the shaft 32 and is electrically interconnected with the tachometer 33 (FIGURE 13), as noted earlier.

*Back gear train*

As noted earlier, the back gear train 26 (FIGURE 6) provides selectively a high range ratio or a low range slowdown ratio from its input shaft 51 to the spindle drive sleeve 52. In the present example, the variable pitch pulley system 30, combined with the back gear train 26, provides a gear ratio of 43 r.p.m. to 300 r.p.m. from the output shaft 32 (FIGURE 3) to the spindle drive sleeve 52 when the back gear train 26 is adjusted to its low range ratio. In the low range setting, the back gear train provides a reduction of 7 to 1 from its input shaft 51 to the spindle drive sleeve 52. In its high range setting, the back gear train provides the 1 to 1 ratio from its input shaft 51 to the spindle drive sleeve 52. By operation of the variable pitch pulley system 30 in the high range setting, there is provided a spindle speed range of 300 r.p.m. to 2100 r.p.m.

described in detail, the input shaft 51 (FIGURE 6) includes a co-axial output shaft 116 which is driven either at the 1 to 1 high range ratio or at the slow-down, low range ratio through operation of the back gear train 26. It will be noted in FIGURE 6 that the back gear train 26 is enclosed as a unit in a gear box 120 which is mounted in a compartment 121 formed in the outer end portion of the housing 14. The upper portion of gear box 120 includes a flange 122 seated upon the top wall 22 of housing 14 and secured thereto by screws 123. As described in detail below, the input shaft 51 and its lower section 116 are journalled within the gear box 120. The spindle drive sleeve 52 is also journalled within the gear box 120.

The upper end of the input shaft 51 is journalled in a ball bearing 124 which is confined in a bearing plate 125 secured as at 126 to the top wall of gear box 120. The input pulley, previously indicated at 112, is keyed as at 127 to the input shaft 51 and is clamped against the ball bearing 124 by a retainer ring 128 which is threaded upon the upper portion of shaft 51. The opposite side of the ball bearing 124 is engaged by collar 130 which seats against the back gear train. In order to provide the speed reduction, the lower end of shaft 51 includes a pilot section 131 (FIGURE 6) which is journalled in a ball bearing 132 seated in a recess 133.

The back gear train 26 (FIGURES 6–8) comprises a drive input pinion 134 keyed to the input shaft 51 and meshing with a set of three driven gears 135 which are keyed to the stub shafts 136. The stub shafts, in turn, are journalled in ball bearings 138. The ball bearings 138 are mounted in a cylindrical gear housing, indicated generally at 140. The stub shafts 136 each include a driven pinion 141 meshing with an output gear 142 formed on the upper end of the lower shaft section 116.

The gear housing 140 is essentially of two-piece construction, comprising an upper section or cover 143 and a lower section 144 (FIGURE 6) which encloses the gear train. The upper section 143 is secured as at 145 to the lower section for assembly purposes. The lower portion of lower housing section 144 includes a sleeve 146 extending downwardly and the output shaft 116 is journalled in the sleeve by ball bearings 147—147 for rotation relative to the housing in the low speed range. The ball bearings 147—147 are held in spaced relationship by a spacer 148 interfitting the output shaft 116 and clamped in place by a threaded retainer ring 150.

The lower end portion of output shaft 116 is journalled in a ball bearing 151 which is mounted in a bearing housing 152. The bearing housing 152 is secured as at 153 to the bottom wall of gear box 120. The ball bearing 151 is seated against the gear 53 and is clamped in place by a retainer ring 154 which is attached to the bearing housing 152. The gear 53 is keyed as at 155 to the output shaft 116 so as to drive the gear 54 and spindle sleeve 52 at the selected spindle speed.

The spindle drive sleeve gear 54 is keyed as at 156 to the lower portion of the spindle sleeve 52. The sleeve above the gear is journalled in a ball bearing 157 seated in the gear box 120 and clamped in place by a threaded ring 158 which engages gear 54 and clamps the bearing in place through a spacer 160. The upper portion of the sleeve 52 is journalled in a ball bearing 161 which is seated in a bearing ring 162 attached to the top of gear box 120.

Lubrication is supplied to the back gear train by way of a lubricant line 163 (FIGURE 6) leading to a fitting 164, which is mounted on a bracket 165 above the input pulley 112. The fitting 164 includes a swivel joint (not shown) communicating with an axial bore 166 formed in the input shaft 51. A supply of oil is confined in the lower portion of the housing 14 and a motor driven pump 167 (FIGURE 3) circulates lubricant from the lower portion of the housing by way of the line 163 to the axial bore 166 of the input shaft 51. The lubricant passes from the lower end of bore 166 to the cylindrical gear housing 140, such that a stream of oil flows by gravity over the gears, pinions and bearings of back gear train 26 during operation of the transmission system.

Operation of the back gear train 26 is regulated by the electrically operated clutch, indicated generally at 168 and the electrically operated brakes 170 and 171 (FIGURES 3 and 6). The clutch 168, as explained below, provides the high range 1 to 1 ratio upon being energized (engaged) by the rotary selector switch 36 of the control panel (FIGURE 13). The brake 170, upon being energized by the selector switch 36 provides operation of the back gear train at the low range speed reduction ratio. The brake 171, upon being energized by the jog switch 41 or by a selector lever on the drill head, as explained later, interrupts spindle rotation but permits the spindle motor 28 to continue operating during a tool change operation. The spindle is thus jogged in order to rotate it to the proper position for carrying out the tool change operation. It will be understood that the operation of the high range clutch 168, the low range brake 170 and the spindle brake 171, may also be regulated by the programming apparatus under tape control when the machine is so equipped.

The high range clutch 168, the low range brake 170 and spindle brake 171 are all shown in the disengaged position in FIGURE 6. Generally speaking, when the high range clutch 168 is energized, a direct driving connection is established from the input shaft 51 to the output shaft 116. When the low range brake 170 is energized (with the high range clutch deenergized), the cylindrical gear housing 140 is locked against rotation. This causes the drive from the input shaft 51 to be established through the back gear train 26 to the output shaft 116 at the low range ratio. When the spindle brake 171 is energized (with the high range clutch 168 and low range brake 170 deenergized), the output gear 53 is locked against rotation so as to brake the spindle to a stop. In this setting, the back gear train acts as a planetary transmission to rotate the gear housing 140 without driving the spindle, thus permitting motor 28 to continue running for jogging the spindle.

The high range clutch 168, the low range brake 170 and the spindle brake 171 are all shown in the disengaged or neutral position in FIGURE 6. It will be understood that the electrical system is arranged to permit only the high range clutch 168 to be energized when a signal is transmitted for high range operation, leaving the low range brake 170 and spindle brake 171 deenergized. On the other hand, the control system energizes only the low range brake 170, leaving the high range clutch 168 and spindle brake 171 deenergized for low range operation. Upon being signalled for spindle braking, the control system energizes the brake 171, leaving the high range clutch 168 and low range brake 170 deenergized. When the spindle jogging signals are received, the control system momentarily deenergizes brake 171 and energizes low range brake 170 for the jogging impulses.

The high range clutch, the low range brake, and the spindle brake are of conventional design. Briefly, the high range clutch 168 comprises a coil housing 172 keyed as at 173 to the input shaft 51 (FIGURE 6). An electromagnetic coil and core element 174 mounted in housing 172 is energized by brushes 175—175 mounted in a stationary brush holder 176. The brush holder 176 is supported by a bracket 177 secured as at 178 to the top wall of gear box 120. The coil housing 172 includes a ring 180 formed of dielectric material and including a pair of slip rings 181—181 which are slidably contacted by the brushes 175. The circuit is completed from the slip rings 181 to the coil element 174, as indicated at 182.

The clutch 168 includes an armature ring 183 (FIGURE 6) which is connected by driving pins 184 to the upper section 143 of gear housing 140. When the coil element 174 is energized, the armature ring 183 is drawn into frictional engagement with the coil element. This creates a frictional engagement, causing the armature ring 183 to be rotated in unison with input shaft 51, thereby establishing a driving connection by way of the driving pins 184 to the gear housing 140.

The low range brake 170 comprises a coil element 185 which is anchored in stationary position upon the flange 186 of a bearing collar 187 which confines one of the bearings 147 of the output shaft 116. The flange 186 is secured by screws 188 to the lower wall of the gear box 120. The brake 170 includes an armature ring 190 which is shiftably connected to the rotary gear housing 140 by a series of pins 191. The armature ring is normally biased in the disengaged position, as shown in FIGURE 6, by respective coil springs 192 confined on the pin 191. The armature ring 190 includes a facing 193 which establishes a frictional engagement with the coil element 185 when the coil is energized. Electrical energy is conducted to the coil element 185 by way of a pair of binding posts, one of which is indicated at 194 in FIGURE 6. Thus, when the coil element is energized, the cylindrical housing 140 is frictionally held against rotation, thereby driving the output shaft 116 at the low range ratio through the back gear train 26.

The spindle brake 171 is identical to the low range brake 170. The coil element 185 of brake 171 is anchored as at 195 to the bottom wall of the gear box 120. The armature ring 190 of brake 171 is shiftably anchored to the output gear 53 by a series of driving pins 191, which include coil springs 192, as described above. Thus, when the coil element of brake 171 is energized, the output gear 53 is frictionally locked with respect to the gear box 120.

*Operation*

Figures 1, 8:
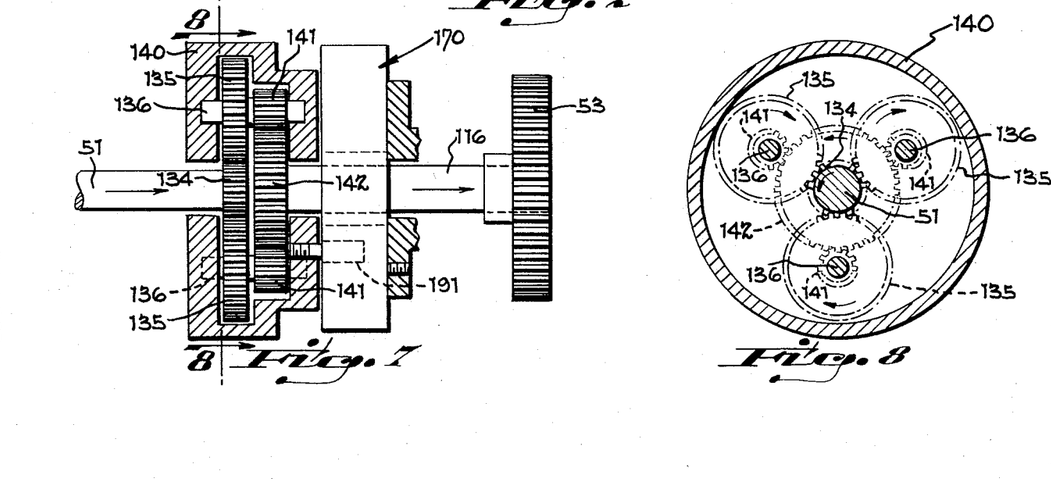
FIGURE 8 is a diagrammatic section, as viewed generally along the line 8—8 of FIGURE 7, showing the operation of the back gear train in the low range setting.

The operation of the back gear train in the low speed range is shown diagrammatically in FIGURES 7 and 8 with the low range brake 170 energized, and with the high speed clutch 168 and spindle brake 171 deenergized. As explained above, upon being energized, brake 170 locks the rotary gear housing 140 in a stationary position. Accordingly, rotation of input shaft 51 at a selected speed (variable pitch pulley system 30), imparts rotary motion to the input pinion 134 of shaft 51, as indicated by the arrow in FIGURE 8. Rotation of the input pinion 134 rotates the driven gears 135 and driven pinions 141 which, in turn, rotate the output gear 142 of shaft 116 at the low range ratio. The drive is completed to the spindle drive shaft 15 by way of the gears 53 and 54, as explained earlier.

Figures 9, 11:
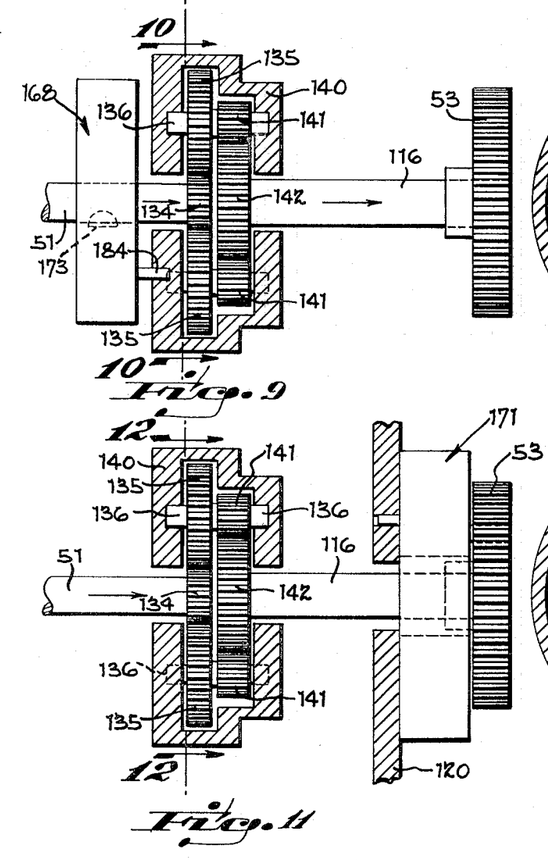
FIGURE 9 is a diagrammatic view similar to FIGURE 7, showing the operation of the back gear train with the high speed clutch engaged.
FIGURE 11 is a diagrammatic view similar to FIGURES 7 and 9, showing the back gear train with the electrically operated spindle brake energized for stopping or jogging the spindle.
Figure 10:
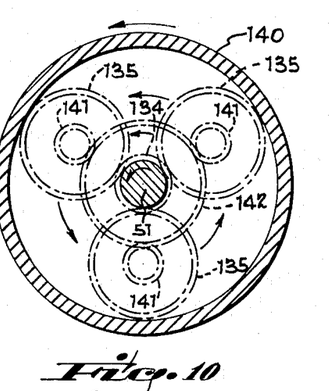
FIGURE 10 is a sectional view taken along line 10—10 of FIGURE 9 showing the operation of the back gear train with the high speed clutch engaged.

When the high range clutch 168 is energized (FIGURES 9 and 10), the gear housing 140 is locked directly to the input shaft 51, causing the housing 140 to rotate in unison with input shaft 51, as indicated by the arrows in FIGURE 10. The low range clutch 170 and spindle brake 171 are both deenergized (disengaged) when the high range clutch is energized. During rotation of housing 140, the back gear train 26 forms a direct driving connection between input shaft 51 and output shaft 116. In other words, the gears and pinions remain stationary with respect to one another but rotate as a unit with housing 140 to drive the output shaft 116 at the 1 to 1 rate with input shaft 51.

Figure 12:
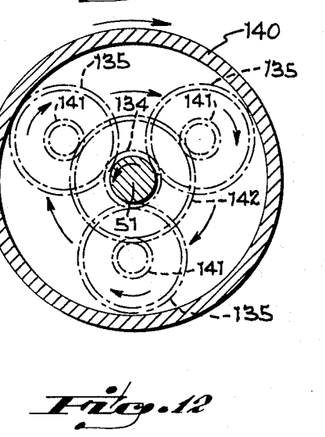
FIGURE 12 is a diagrammatic sectional view taken along line 12—12 of FIGURE 11, further illustrating the operation of the back gear train with the spindle brake energized.

When the spindle brake 171 is energized (FIGURES 11 and 12), the output shaft 116 is locked in stationary position to stop the spindle. In this case, the high range clutch 168 and low range brake 171 are both deenergized to permit the spindle motor 28 to remain energized. Thus, as indicated by the arrows in FIGURE 12, the input pinion 134 of input shaft 51 rotates the driven gears 135 about their axes. Since the driven pinions 141 mesh with the stationary output gear 142 of shaft 116 (which is locked against rotation), the back gear train is now converted into a planetary transmission which imparts rotary motion to the gear housing 140 while the shaft 116 and spindle 6 remain stationary. This operation permits the spindle to be jogged to a proper rotary position for the tool change operation by momentarily deenergizing the spindle brake 171 (jog switch 41) and momentarily energizing the low range brake 170. The planetary action thus saves time in jogging and makes it possible to rotate the spindle to a selected position with accuracy since the momentum effect of the main motor is eliminated.

The back gear train 26 may also be regulated by a selector lever 196 (FIGURE 1) mounted adjacent the spindle for convenient manual control. This lever has three positions corresponding to neutral, spindle forward, and spindle braking and is arranged to actuate three switches in the electrical system. Thus, when set at neutral, the electrical clutches and brakes are disengaged, as shown in FIGURE 6. When shifted to the forward position, the selected high or low range clutch or brake is energized. When shifted to the braking position the spindle brake 171 is engaged.

*Spindle feed and rapid traverse drive*

Axial feed motion is imparted to the spindle 6 by way of the pulley system, indicated diagrammatically at 55 (FIGURE 2). The spindle feed driving system 55 includes a pulley 197 (FIGURES 2 and 6) keyed as at 198 to the upper end of the spindle sleeve 52 and clamped in place between the collar 200 and threaded retainer ring 201. The pulley 197 includes teeth meshing with the teeth of a timer belt 202.

The belt 202 is tracked about a feed pulley 203 which is keyed to the input shaft 56 of the feed transmission 27 (FIGURES 2 and 5). In order to control the tension of the belt 202, there is provided an idler pulley 204 journalled upon a shaft 205 projecting upwardly from a bracket 206. The bracket is adjustably secured as at 207 to the top wall 22 of housing 14.

As shown in FIGURE 5, the feed pulley 203 is keyed as at 208 to the input shaft 56 of feed transmission 27. The input shaft 56 is journalled in ball bearings 210 mounted in the housing 14. The drive from the input shaft 56 is completed through feed transmission 27 by a horizontal input shaft 211. The input shaft 211 includes a spiral gear 212 meshing with a companion spiral gear 213 which is keyed to the vertical input shaft 56.

As noted earlier, the spindle feed transmission 27 (FIGURE 5) does not form a part of the present invention. In general, it includes electrically operated clutches which are controlled by the spindle feed selector switch 43 mounted upon the control panel 34 (FIGURE 13). The spindle transmission includes an output shaft 214 (FIGURE 5) having a bevel gear 215 meshing with a bevel gear 216 slidably splined to the shaft 16. For this purpose, bevel gear 216 includes a sleeve portion 217 slidably interfitting feed shaft 16 and journalled as at 218—218 within a portion of the housing 14. The feed motion is thus transmitted to the spindle at a selected rate which is related to the selected spindle speed provided by the variable pulley system and back gear train.

The spindle is advanced or retracted axially at the rapid traverse rate by operation of the reversible rapid traverse motor 45 (FIGURES 2 and 3), which is mounted on the top wall of the housing 14. Motor 45 is mounted in an upright position and depends downwardly from a mounting plate 220 which is secured upon the top wall 22 of housing 14. The rapid traverse motor includes a timer type pulley 221 which is keyed to the shaft of motor 45.

A timer belt 222 (FIGURES 2 and 5) connects the pulley 221 of the rapid traverse motor to a traverse pulley 223. As best shown in FIGURE 5, the pulley 223 is keyed to a sleeve 224 which is shiftably splined to the upper portion of the spindle feed shaft 16. The sleeve 224 is journalled in ball bearings 225 confined in a ball bearing cage 226 which is attached to the top wall 22 of housing 14.

As explained earlier, the reversible rapid traverse motor 45 is energized either by the tape control apparatus or by the traverse switches 46 and 47 of the control panel. The electrical control system is arranged to disengage the clutches of the feed transmission 27 when the rapid traverse motor is energized. When the spindle is being fed at a selected feed rate by the transmission 27, the rapid traverse motor is deenergized and its armature is free to idle.

Having described my invention I claim:

1. A variable speed transmission system for rotating the spindle of a machine tool at selected speed rates and for imparting rotary jogging motion to the spindle comprising:

a power motor;
a driving system connected to the motor and adapted to provide individual spindle speeds;
a speed selector motor in driving connection with said driving system and adapted to adjust the driving system, thereby to provide a selected speed;
switch means for controlling the operation of said speed selector motor;
a back gear train having an input shaft connected to the driving system;
a rotatable gear housing adapted to be coupled to the input shaft;
an output shaft journalled in coaxial relationship to the input shaft, said back gear train journalled within the gear housing and interconnecting the input and output shafts;
an electrically operated clutch for coupling the input shaft to the rotatable gear housing for rotating the housing in unison with the input shaft, whereby said back gear train provides a direct high range driving connection between the rotatable gear housing and output shaft;
an electrically operated brake for holding the rotatable gear housing in stationary position, whereby said back gear train provides a low range driving ratio between the input shaft and the output shaft, said output shaft being in driving connection with said machine tool spindle;
and means for holding said output shaft in stationary position, thereby to stop the spindle, said back gear train thereupon being converted into a planetary gear train adapted to impart rotary motion to the gear housing, thereby adapting the power motor to continue running, adapting the back gear train to impart jogging motion to the spindle by momentarily releasing the said holding means of the output shaft while the rotatable gear housing momentarily is braked by said electrically operated brake.

2. A variable speed transmission system for rotating the spindle of a machine tool at selected speed rates and for imparting rotary jogging motion to the spindle comprising:

a power motor;
a driving system connected to the motor and adapted to provide individual spindle speeds;
a speed selector motor in driving connection with said driving system and adapted to adjust the driving system, thereby to provide a selected speed;
switch means for controlling the operation of said speed selector motor;
a back gear train having an input shaft connected to the driving system;
a rotatable gear housing adapted to be coupled to the input shaft;
an output shaft journalled in coaxial relationship to the input shaft, said back gear train journalled within the gear housing and interconnecting the input and output shafts;
an electrically opertaed clutch for coupling the input shaft to the rotatable gear housing for rotating the housing in unison with the input shaft, whereby said back gear train provides a direct high range driving connection between the rotatable gear housing and output shaft;
a first electrically operated brake for holding the rotatable gear housing in stationary position, whereby said back gear train provides a low range driving ratio between the input shaft and the output shaft, said output shaft being in driving connection with said machine tool spindle;
a second electrically operated brake for holding said output shaft in a stationary position thereby to stop the spindle, said back gear train thereupon being converted into a planetary gear train adapted to impart rotary motion to the gear housing, thereby adapting the power motor to continue running, adapting the back gear train to impart jogging motion to the spindle by momentarily releasing the second electrically operated brake and stopping the rotary gear housing by operation of the first electrically operated brake.

3. A variable speed transmission system for rotating the spindle of a machine tool at selected speed rates and for imparting rotary jogging motion to the spindle comprising:

a power motor;
a driving system connected to the motor and adapted to provide individual spindle speeds;
a speed selector motor in driving connection with the said driving system and adapted to adjust the driving system, thereby to provide a selected speed;
switch means for controlling the opertaion of said speed selector motor;
a back gear train having an input shaft connected to the said driving system;
a rotatable gear housing adapted to be coupled to the input shaft;
an output shaft journalled in coaxial realtionship to the input shaft, said back gear train journalled within the gear housing and interconnecting the input and output shafts;
an electrically operated clutch for coupling the input shaft to the rotatable gear housing for rotating the housing in unison with the input shaft, whereby the said back gear train provides a direct high range driving connection between the rotatable gear housing and output shaft;
a first electrically operated brake for holding the rotatable gear housing in stationary position, whereby said back gear train provides a low range driving ratio between the input shaft and the output shaft, said output shaft being in driving connection with said machine tool spindle;
a second electrically operated brake for holding said output shaft in stationary position, thereby to stop the spindle, the said back gear train thereupon being converted into a planetary gear train adapted to impart rotary motion to the gear housing, thereby adapting the power motor to continue running, adapting the back gear train to impart jogging motion to the spindle by momentarily releasing said second electrically operated brake and stopping the rotary gear housing by operation of the first electrically operated brake;
and means for energizing said electrically operated clutch, first brake and second brake selectively, thereby to drive the spindle at said high range, low range ratio or to stop the spindle.

References Cited by the Examiner

UNITED STATES PATENTS

| | | | |
|---|---|---|---|
| 2,439,079 | 4/1948 | Davidson | 74—740 |
| 2,504,306 | 4/1950 | Curtis et al. | 74—789 |
| 2,557,324 | 6/1951 | Tomlinson | 74—740 |
| 2,782,651 | 2/1957 | Sassen et al. | 74—364 |
| 2,860,529 | 11/1958 | Sommer | 192—4 X |

FOREIGN PATENTS

| | | |
|---|---|---|
| 909,127 | 11/1945 | France. |
| 986,943 | 4/1951 | France. |
| 613,078 | 5/1935 | Germany. |

OTHER REFERENCES

"Product Engineering," page 52, April 10, 1961.

DAVID J. WILLIAMOWSKY, *Primary Examiner.*

BROUGHTON G. DURHAM, *Examiner.*

T. C. PERRY, *Assistant Examiner.*